H. O. WOLFE.
BARREL MOVING IMPLEMENT.
APPLICATION FILED JUNE 8, 1917.
1,244,680.
Patented Oct. 30, 1917.
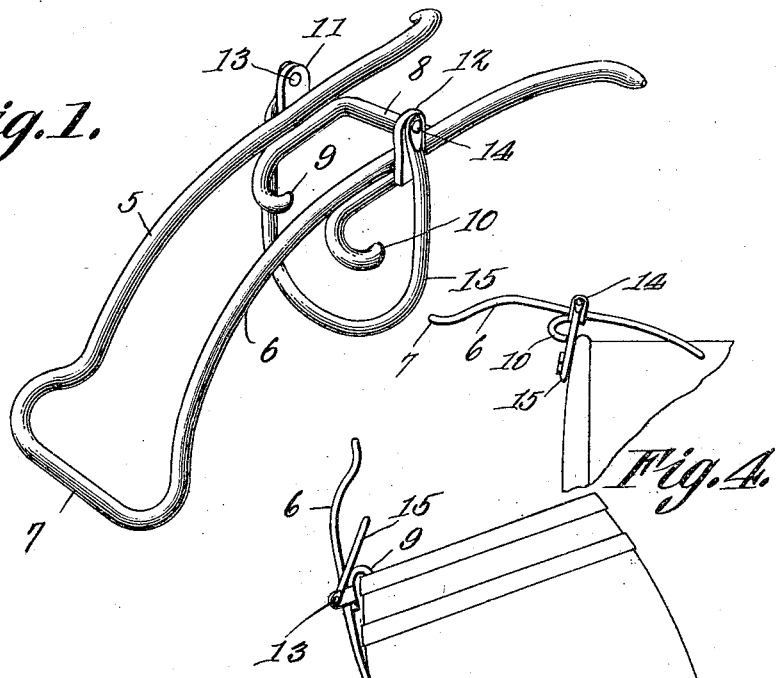
Fig. 1.
Fig. 4.
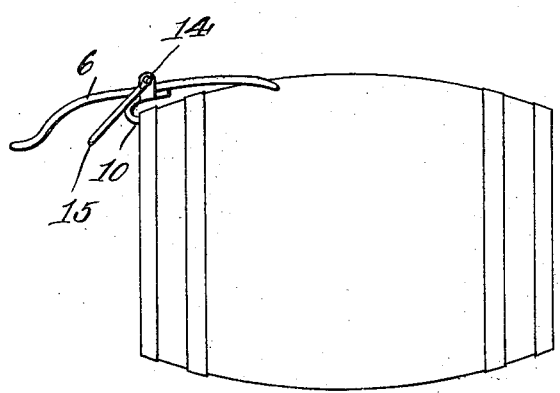
Fig. 3.
Fig. 2.
Homer O. Wolfe, Inventor,
By *(signature)*, Attorney

UNITED STATES PATENT OFFICE.

HOMER O. WOLFE, OF SULLIVAN, INDIANA.

BARREL-MOVING IMPLEMENT.

1,244,680.  Specification of Letters Patent.  Patented Oct. 30, 1917.

Application filed June 8, 1917. Serial No. 173,564.

*To all whom it may concern:*

Be it known that I, HOMER O. WOLFE, a citizen of the United States of America, and resident of Sullivan, in the county of Sullivan and State of Indiana, have invented certain new and useful Improvements in Barrel-Moving Implements, of which the following is a specification.

This invention relates to barrel moving implements and particularly to a clamping device adapted to partially embrace the end of a stave and seat itself in the chime so that it will be held in place during its manipulation to move a barrel, means being provided whereby a portion of the manipulating device bears against the outer surface of the staves, so that bracing or clamping action results which will prove effective to hold the implement in place while it is being manipulated for handling barrels.

An object of this invention is to provide an implement which can be made effective for tilting barrels, for lifting them on end or for lifting them bodily, the said invention also including means by which bungs of barrels may be engaged or whereby the ends of staves of barrels may be clamped with such frictional engagement as to retain the implement in place until purposely released.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in perspective;

Fig. 2 illustrates a view in side elevation of a barrel with the invention applied thereto;

Fig. 3 illustrates a view in elevation of a barrel showing the employment of the device for tilting the barrel from the end to the side; and Fig. 4 illustrates a view in side elevation showing the device applied to a bung of a barrel.

The implement comprises a body consisting of a strip of metal doubled on itself to form arms 5 and 6, and having a looped portion shaped to form a handle 7. The ends of the arms preferably diverge slightly so that they will bear against the sides of a barrel at points somewhat distant from each other.

A yoke 8 is welded or otherwise secured to the arms 5 and 6 and the said yoke has curved ends 9 and 10 forming hooks which are adapted to embrace the ends of barrel staves so as to prevent dislodgment or disengagement of the hooks when the implement is in use.

Lugs or ears 11 and 12 may be secured to the yoke and arms and they have pivots 13 and 14 respectively on which a bung engaging member 15 is pivoted, the said bung engaging member being looped to pass over the hooks 9 and 10 and to swing freely so that the bung engaging member may assume different positions with relation to an end of a barrel to which the implement is applied. In the application of the implement to a barrel, as shown in Fig. 3, the barrel may be moved from its end to its side and, as shown in Fig. 2, it may be lifted from the side to the end. In fact, the mode of operation and the manner of use may be variously modified as will be apparent to those skilled in the art.

I claim:

In a barrel moving implement, a member comprising parallel arms, a handle connecting said arms, diverging extensions on the forward ends of the arms adapted to engage the outer surface of the barrel, a yoke connected to the arms, ears mounted on the said arms and yoke, and a bung engaging element pivotally mounted on said ears.

HOMER O. WOLFE.

Copies of this patent may be obtained for five cents each, by addressing the "Commissioner of Patents, Washington, D. C."